US007779985B2

(12) United States Patent
Gysi (10) Patent No.: US 7,779,985 B2
(45) Date of Patent: Aug. 24, 2010

(54) METHOD AND DEVICE FOR CONVEYING OBJECTS FOR PROCESSING

(75) Inventor: Peter Gysi, Bellikon (CH)

(73) Assignee: Soudronic AG, Bergdietikon (CH)

( * ) Notice: Subject to any disclaimer, the term of this patent is extended or adjusted under 35 U.S.C. 154(b) by 685 days.

(21) Appl. No.: 11/660,402

(22) PCT Filed: Aug. 10, 2005

(86) PCT No.: PCT/CH2005/000467

§ 371 (c)(1),
(2), (4) Date: Feb. 15, 2007

(87) PCT Pub. No.: WO2006/017953

PCT Pub. Date: Feb. 23, 2006

(65) Prior Publication Data

US 2007/0258803 A1     Nov. 8, 2007

(30) Foreign Application Priority Data

Aug. 18, 2004   (CH) ..................................... 1357/04
Aug. 30, 2004   (CH) ..................................... 1434/04

(51) Int. Cl.
B65B 25/00      (2006.01)
(52) U.S. Cl. .............. 198/346.2; 198/346.1; 198/346.3; 198/617
(58) Field of Classification Search .............. 198/343.1, 198/346, 346.1, 346.2, 346.3, 774.2, 775; 414/749.1
See application file for complete search history.

(56) References Cited

U.S. PATENT DOCUMENTS

| | | | | |
|---|---|---|---|---|
| 3,888,341 | A * | 6/1975 | Konkal et al. | 198/345.3 |
| 3,999,495 | A | 12/1976 | Rouse et al. | 113/113 R |
| 4,026,226 | A | 5/1977 | Hahn et al. | 113/1 F |
| 4,390,172 | A * | 6/1983 | Gotman | 269/56 |
| 4,394,897 | A * | 7/1983 | Brems | 198/345.3 |
| 4,546,873 | A | 10/1985 | Debenham et al. | 198/836 |
| 5,062,188 | A * | 11/1991 | Jones et al. | 29/33 P |
| 5,131,125 | A * | 7/1992 | Coron | 29/33 P |
| 5,439,091 | A * | 8/1995 | Mason | 198/346.2 |
| 5,473,978 | A * | 12/1995 | Colombo | 99/443 C |
| 6,354,431 | B1 * | 3/2002 | DeCecca et al. | 198/775 |
| 6,752,258 | B2 * | 6/2004 | Ludwig et al. | 198/465.3 |
| 7,204,364 | B2 * | 4/2007 | Allgaier | 198/465.1 |

FOREIGN PATENT DOCUMENTS

DE          29 24 755        1/1981

OTHER PUBLICATIONS

International Search Report of PCT/CH2005/000467 Dated Oct. 31, 2005.

* cited by examiner

*Primary Examiner*—Douglas A Hess
(74) *Attorney, Agent, or Firm*—McCormick, Paulding & Huber LLP (57) ABSTRACT

The invention relates to a linear conveyor device (30) for objects (20), whereby the objects are taken by drive tongues (40), arranged on circulating toothed belts (31, 32). The objects are secured against lifting off the conveyor device, particularly mechanically, by a cover strip (50). Light objects can thus also be conveyed at high rate in intermittent operation.

28 Claims, 9 Drawing Sheets

METHOD AND DEVICE FOR CONVEYING OBJECTS FOR PROCESSING

CROSS REFERENCE TO RELATED APPLICATION

This application claims the benefit of PCT Application No. PCT/CH2005/000467, filed on Aug. 10, 2005 and claims priority from Swiss Patent Application No. 1357/04 of Aug. 18, 2004 and from Swiss Patent Application No. 1434/04 of Aug. 30, 2004, the entire disclosures of which are incorporated herewith by reference.

BACKGROUND OF THE INVENTION

The invention concerns a method for conveying objects to be processed and a device for the conveyance of objects A preferred use or method is in the field of making package covers each of which includes a cover ring and a tear off foil arranged over the ring.

STATE OF THE ART

It is known to provide covers for cans or other pot-like packages, such as metal covers permanently fastened to the upper sides of the packages, which covers form a removal opening which up to the time of first use of the package contents is closed by a tear-away foil, especially a metal foil, applied to the remainder of the cover by heat sealing. An additional plastic cover arranged over the metal cover makes the package recloseable during the useful life of the package contents. A customary processing apparatus for the making of such metal covers is explained in the following with the assistance of FIG. 1. FIGS. 2-8 help to explain the steps involved in the making of such cover.

SUMMARY OF THE INVENTION

The basic object of the invention is to make possible the stepwise conveyance of objects to processing stations at high stepping rates, especially for the cover processing, and to provide a correspondingly fast and simple working apparatus for carrying out the conveyance. These objects are solved by the method in which the objects are conveyed by a linear conveying means while remaining in essentially one plane; the objects are accessible from both their upper sides and their lower sides; the objects at at least one processing station; while the conveying means stands still, are lifted from the conveying means, processed, and returned to the conveying means; and the objects as they are moved between processing stations are secured against being lifted from the conveyor means. The objects are also solved by the apparatus in which the objects are conveyed by a linear conveying means while remaining in essentially one plane; the objects at timewise spaced stationary pauses of the conveyor device are liftable from and returnable to the conveyor device, and the objects during their conveying movement are secured against being lifted from the conveyor device.

By the conveyance of the objects in essentially one plane and the securing of the objects against being lifted during the advancement steps or advancement periods, a high stepping rate and a simple layout of a manufacturing line is possible.

In a preferred design of the conveying device such device includes toothed belts spaced from one another and having arranged thereon driving tongues or supports for the objects to be conveyed. Preferably the toothed belts are adjustable in regard to their spacing so that a format change to suit the conveying device to different shapes and/or sizes of the conveyed objects can be quickly made. For another way of making a format change in a simple way the toothed belts, with their driving tongues, can be exchanged for other toothed belts with differently arranged driving tongues. It is preferred that the driving tongues not be shaped in specific conformance to particular objects to be conveyed, and instead that they be suited to the size and shape of the objects or covers to be transported only by the mentioned adjustment steps. In place of one of the two toothed belts a different support means can be provided for the objects to be conveyed, for example a rail.

It is further preferred that the drive tongues in addition to being fastened to the toothed belts be guided in a guide which inhibits even only momentary deflections or tippings of the driving tongues out of the conveying plane and thereby makes possible very high vibration free stepping rates. The securement against lifting of the objects from the driving tongues is achieved by a stationary mechanical securing, for example by a cover which covers the conveyor in the receiving area of the objects during the conveying movement so that thereby the objects cannot be lifted upwardly from the driving tongues. Preferably the cover and the guide for the driving tongues are unified in the same structural element, such as a cover strip for the toothed belts. The securement against lifting can however also be achieved, for metallic objects, by magnetic means, and especially by using only magnetic means.

BRIEF DESCRIPTION OF THE DRAWINGS

In the following the state of the art and exemplary embodiments of the invention are explained in more detail with the help of the drawings. The drawings show.

DESCRIPTION OF THE PREFERRED EMBODIMENTS

Figure 1:
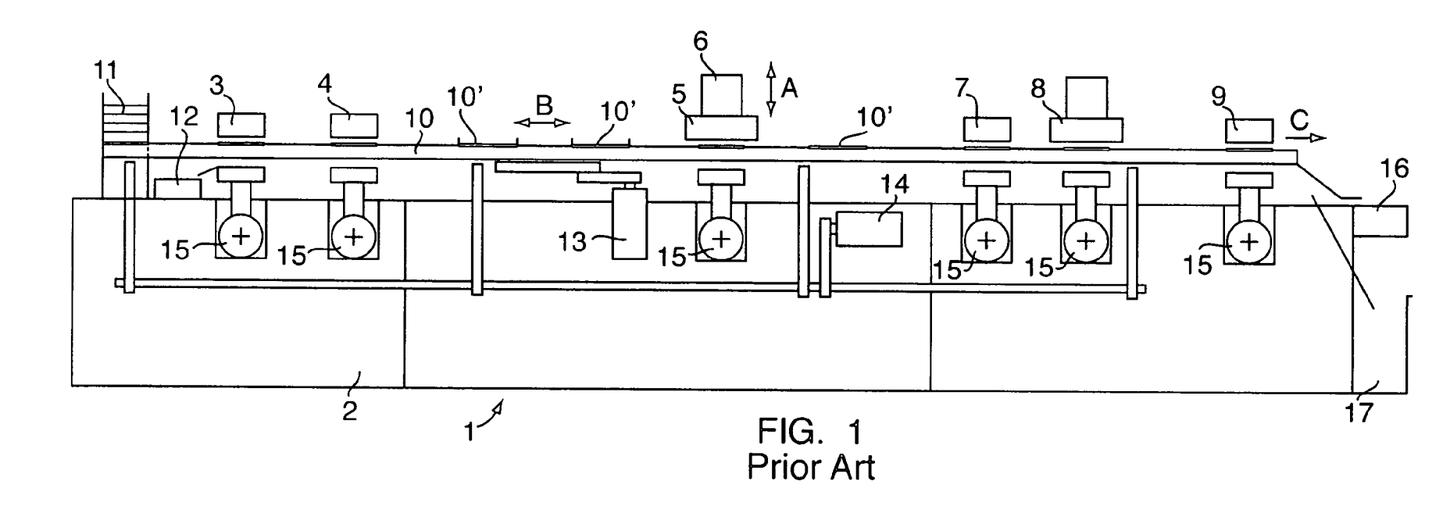
FIG. 1—A schematic side view of a conveyor device according to the state of the art.

With the help of FIGS. 1 to 8, the state of the art concerning a processing machine for the making of metal covers with a tear-off foil is briefly explained. FIG. 1 shows a schematic side view of such an apparatus 1 which on a machine frame 2 has several processing stations 3 to 9. A conveyor device 10, 13, 14 moves objects in the forward direction, which is indicated by the arrow C, from a stack 11 at the starting end of the device to the other end of the device where the objects by way of chutes are moved into the repositories 16, 17. The objects are taken from the stack 11 in a known way and are put onto the conveyor device. This device has two long rails 10 arranged respectively at the opposites sides of the objects, which rails let the objects, lying on supports 10' at the stations 3 to 9 move upwardly in the direction A upon raising of the rails 10 by means of the drive 14. Then by a crank drive 13 the rails and the objects now carried by the rails are moved forwardly in the direction of the arrow B (directed in the same direction as the arrow C) forwardly by a given step amount.

Thereafter the rails are lowered downwardly in the direction of the arrow A so that the objects are again returned to a supported position at the stations 3 to 9 on supports 10'. Then the rails at 10 are moved rearwardly in the direction of the arrow B oppositely to the arrow C below the now otherwise supported positions of the objects in order to be ready to carry out a new cycle of the described stepping process. The objects between the times of their transport are located at rest positions along the length of the conveyor device or are located in the processing stations at which they are processed. After the processing steps of all the processing stations are completed a new forward movement takes place.

Figure 2:
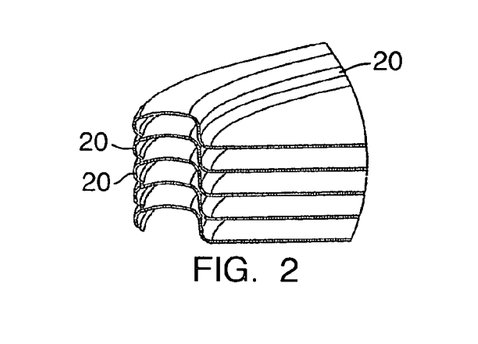
FIGS. 2 to 8—Views showing sections of metal covers to explain their manufacture.

FIG. 2 shows stacked metal cover blanks 20 as an example of the conveyed objects, which blanks are provided in the stack 11. These blanks 20 are, for example, round metal discs of, for example, 11 cm diameter. Of course other basic forms are possible without ado, for example square or rectangular discs and other diameters or sizes. The blanks 20 have already been formed in a non-illustrated processing machine at their edges as shown in FIG. 2. In FIG. 2 and in following FIGS. 3 to 8, only a section of an entire disc is illustrated in order to simplify the drawings.

Figure 3:
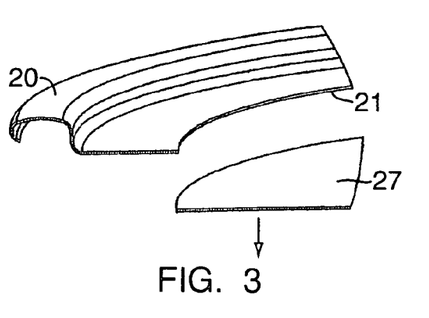

In the first processing station 3 of FIG. 1 an opening is stamped into the disc by way of a stamping process using upper and lower work tools, which opening is visible in FIG. 3, where the edge of the opening is indicated at 21 and the stamped out round disc is indicated at 27. This disc 27 proceeds as waste into the container 12 of FIG. 1. The stamping station 3—as is the case also for the subsequent stations—is driven by a drive 15.

Figure 4:
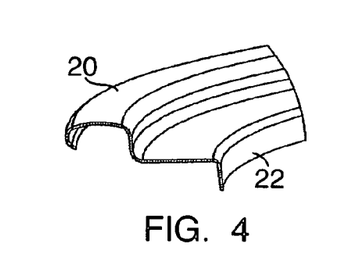

In the processing station 14 the edge 21 is bent downwardly to create the flange illustrated at 22 in FIG. 4.

Figure 5:
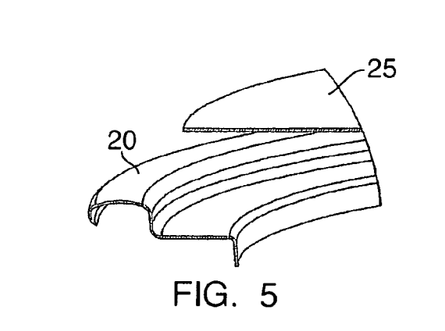
Figure 6:
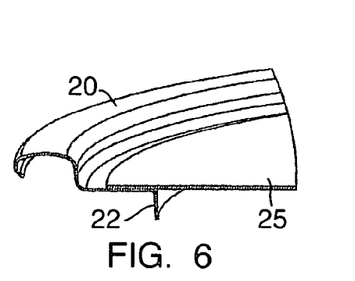
Figure 7:
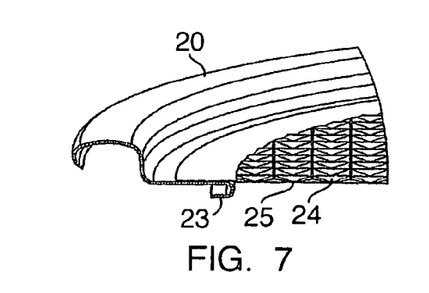

The annular cover blank 20 now is transferred to the processing station 5 in which a foil 25 is placed over the opening of the cover and is fastened thereto by heat sealing, as is shown in FIGS. 5 and 6. The metal foil 25 for this is provided in a known way with a plastic material layer on its underside. The needed round foil blank 25 as a rule is stamped from a wide foil strip in station 5 and is placed in the middle recess of the annular disc. By means of the heat sealing station the foil under the effect of heat is pressed onto the edge of the round recess of the blank 20, so that the foil 25 becomes a tightly connected with the metal cover 20 by melting and subsequent cooling of the plastic layer. This is known and need not be described in more detail here. In any event for the cooling a cooling processing station 7 can be provided.

In the processing station 8 the foil 25 is provided with a embossing 24 (FIG. 7), and the flange 22 is beaded into the finished edge 23.

In a test station 9, likewise shown as a processing station, the finished cover is now subjected to a testing process which as a rule includes a sealing test for the tear off foil 25 applied to the cover. If the foil is found to be tightly fastened to the remainder of the metal cover, the metal cover is moved into the receiver 16 for the finished covers. If a leaky condition is found, the cover is moved by way of the other illustrated chute into the waste container 17.

Figure 8:
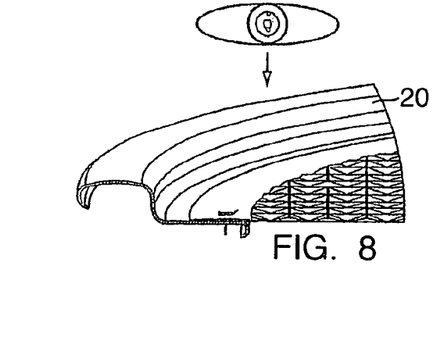
Figure 9:
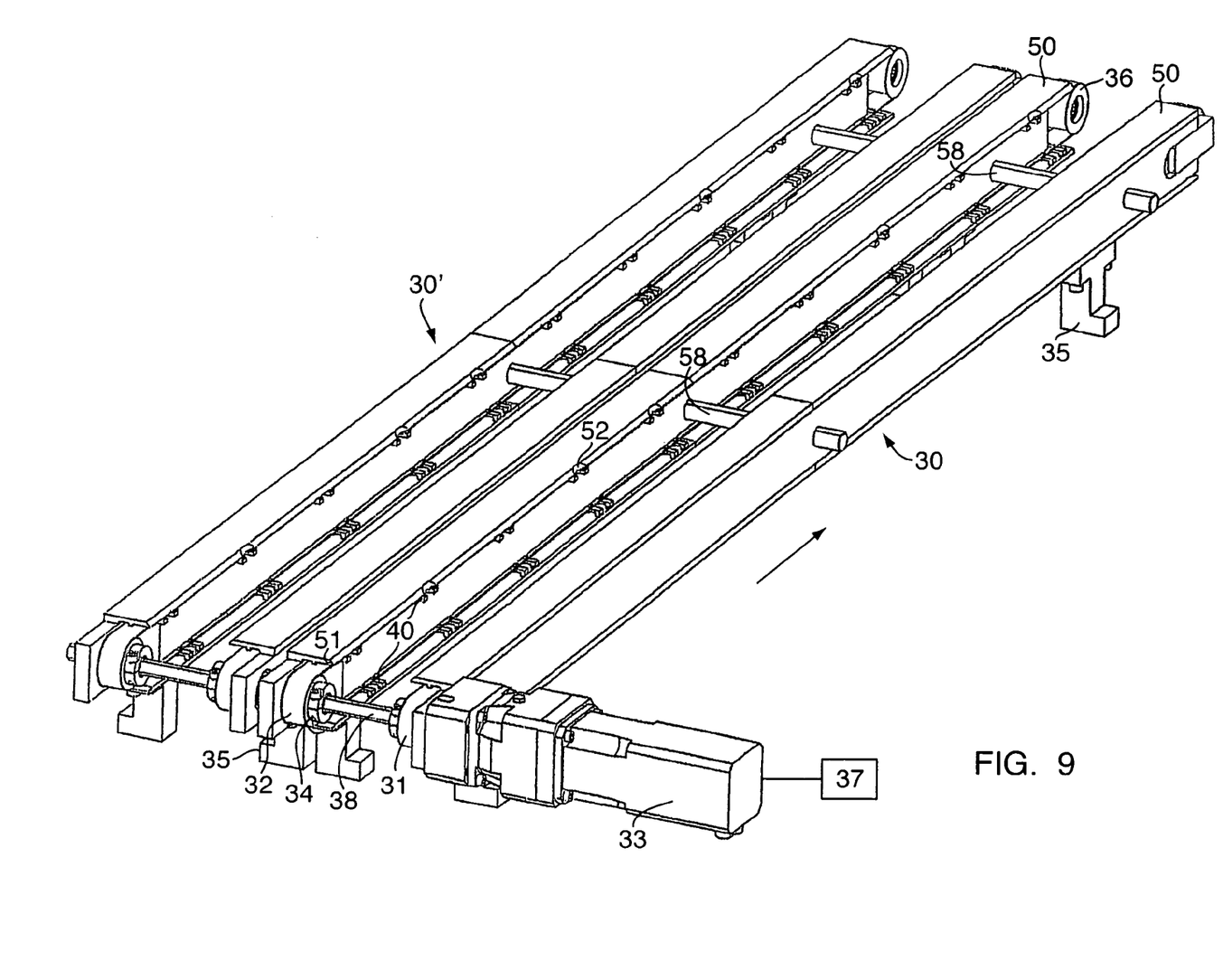
FIG. 9—A view showing an embodiment of a conveyor device according to the invention.

FIG. 8 shows in perspective view a conveyor device 30 according to one embodiment of the invention. This conveyor device 30 is designed for the transport of cover shaped objects of the depicted kind but it can also be used for the conveyance of other objects with the changes necessary for that being capable of being made by persons skilled in the art without anything further. The conveyor device serves again for the stepwise advancement of the objects through a number of processing stations, which preferably are processing stations for the making of covers as previously described. These processing stations are not shown in the FIG. 9 and it will be clear to persons skilled in the art how they can be arranged along the length of the conveyor device to carry out the involved processing. In FIG. 9 a further conveyer device 30' is arranged next to the conveyor device 30. These two conveyor devices can be driven in common by the same drive 33, 37 or each can be provided with its own drive. Additional conveying devices can be provided in the same way in order to increase the total count of the objects conveyed. With the illustrated conveyor device 30, which is described in detail in the following, objects or covers can be conveyed at higher rates of, for example, 200 objects per minute, and with reproducible partial steps between the processing stations. It further implements a flexible concept for accommodating a large format range of the objects or covers, so that in the case of round covers for example their diameters can range from 50 to 200 mm and the covers can have diverse rectangular shapes such as those, for example, for much wanted fish packing cans. The conveyor device further is designed as a compact module which can be used for one track installations or, as shown, for multiple track installations.

In the illustrated preferred embodiment the conveyor device has two toothed belts 31 and 32 which especially with their upper surfaces lie in the same plane, and therefore run in a co-planar manner, and which at the beginning and end of the conveyor device are guided over end rolls 34, 36 so that an endless toothed belt drive results and has the length needed for the number of processing stations involved. The stepwise toothed belt movement is effected by a stepping motor or a servomotor synchronized with the processing stations, which motor drives the toothed belts by toothed rollers as can be seen in the Figure for the motor 33 and the drive shaft 38. In cases where one or more conveyor devices, such as the conveyor device 30', is or are provided their toothed belts can be driven by the same motor through additional drive shafts or each conveyor device can have its own motor drive. The motor 33 is controlled by a controller 37 to perform the stepwise forward movement of the toothed belts, which control 37 is either a complete control for the entire cover manufacturing apparatus and which also controls the processing stations, or which control 37 can be a dedicated control for controlling only the conveyor device and which communicates and cooperates with a higher level control for the cover manufacturing apparatus.

The motor 33 and the associated drive components for the toothed belts are arranged on a machine frame 35 which in the Figure is indicated only by its feet 35. Drive tongues are fastened to the toothed belts, which tongues are indicated generally at 40 in FIG. 9, with each pair of oppositely lying drive tongues of the two toothed belts 31 and 32 forming a receiver for an object to be conveyed. By the toothed belt movement, these objects are moved by receivers formed by the driving tongues 40 along the transport path and in the direction of the illustrated arrow C from the input side of the conveyor device where the motor is located, to the output side at the end roll 36. In the illustrated embodiment a cover 50 is provided over each of the two toothed belts and over its drive tongues, each of which covers its associated toothed belt and a portion of each drive tongue as will explained in more detail hereinafter. In the region of the processing stations these covers 50 each have a recess 52 which permits the removal of a conveyed object from the drive tongues so that the object can be lifted from the drive tongues and processed in the processing station and subsequently can be returned to the drive tongues for driving between the processing stations. As a rule no recesses 50 are provided between the processing stations so that a lifting of the objects from the drive tongues is blocked by the cover 50. Additionally or in place of the blocking of the lifting by way of the cover 50 the drive tongues can also be designed to be magnetic, which likewise hinders a lifting of the objects during the advancement steps, if the objects are at least partially or entirely made from a magnetically attracted material.

It is preferred that the lateral spacing of the toothed belts 31 and 32 from one another is adjustable so that thereby the spacing of the opposed driving tongues 40 on the two toothed belts is adjustable to adapt to the conveyor device to different sizes of objects. For this, in the conveyor device transverse connectors 58 can be provided which permit a simple adjustment of the spacing of the toothed belts from one another. Correspondingly the drive shaft or axle 38 is designed to permit this spacing adjustment. The spacings of the drive tongues 40 on each toothed belt are given by the number and even distribution of the tongues and their fasteners on the toothed belts. This spacing can preferably be changed for the accommodation of the size of the objects in that the toothed belts are exchanged for a set of other toothed belts with a different spacing, one from the other, of the drive tongues which are fastened to it. In this way by adjusting the spacing of the toothed belts relative to one another and by the substitution of toothed belts with differently spaced drive tongues the desired size of receiving areas to accommodate the objects is achieved. In this way a change over of all drive tongues for different sizes of objects can take place simultaneously and in a simple and fast manner.

Figure 10:
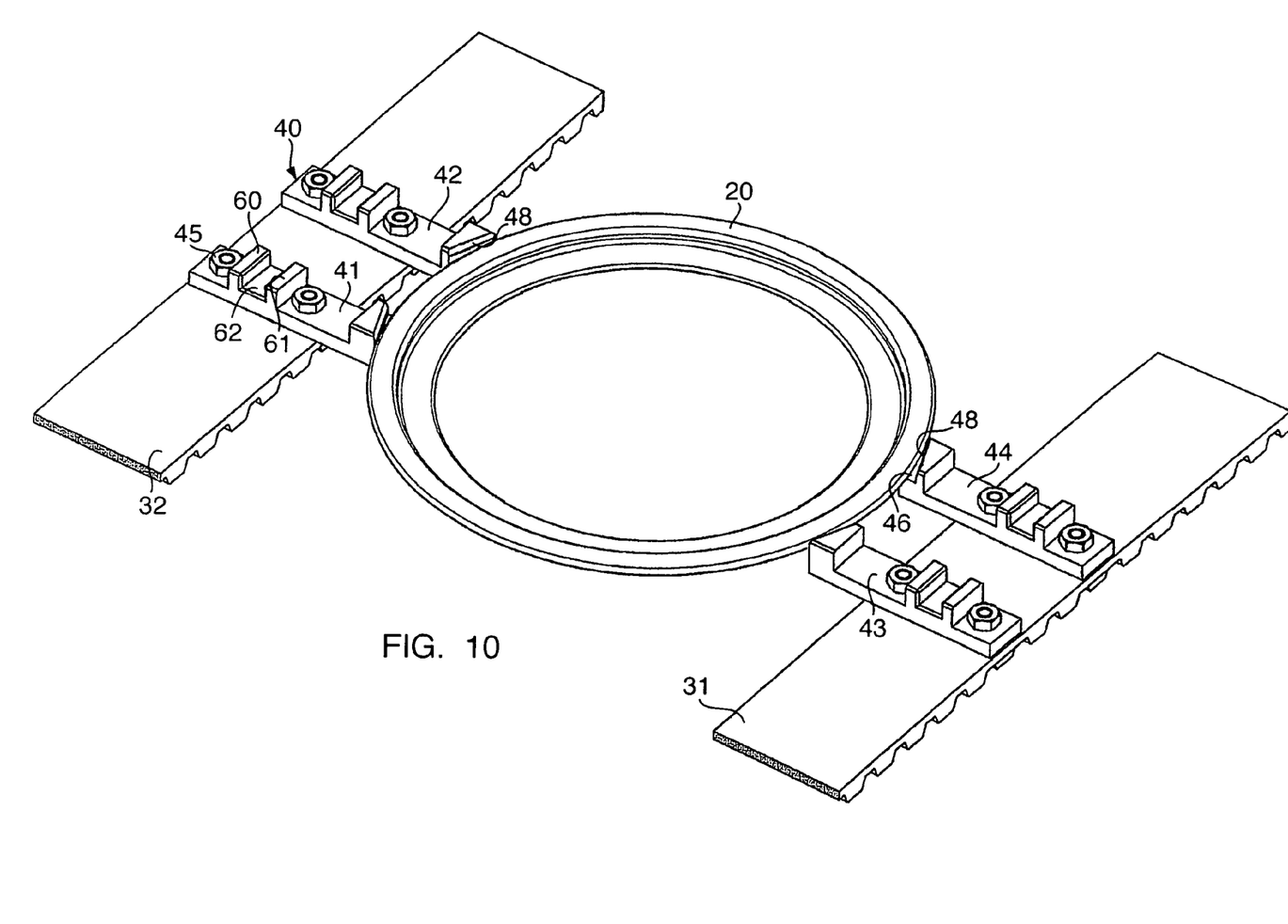
FIG. 10—A view of the toothed belts and drive tongues of the device of FIG. 9 in a first position.
Figure 11:
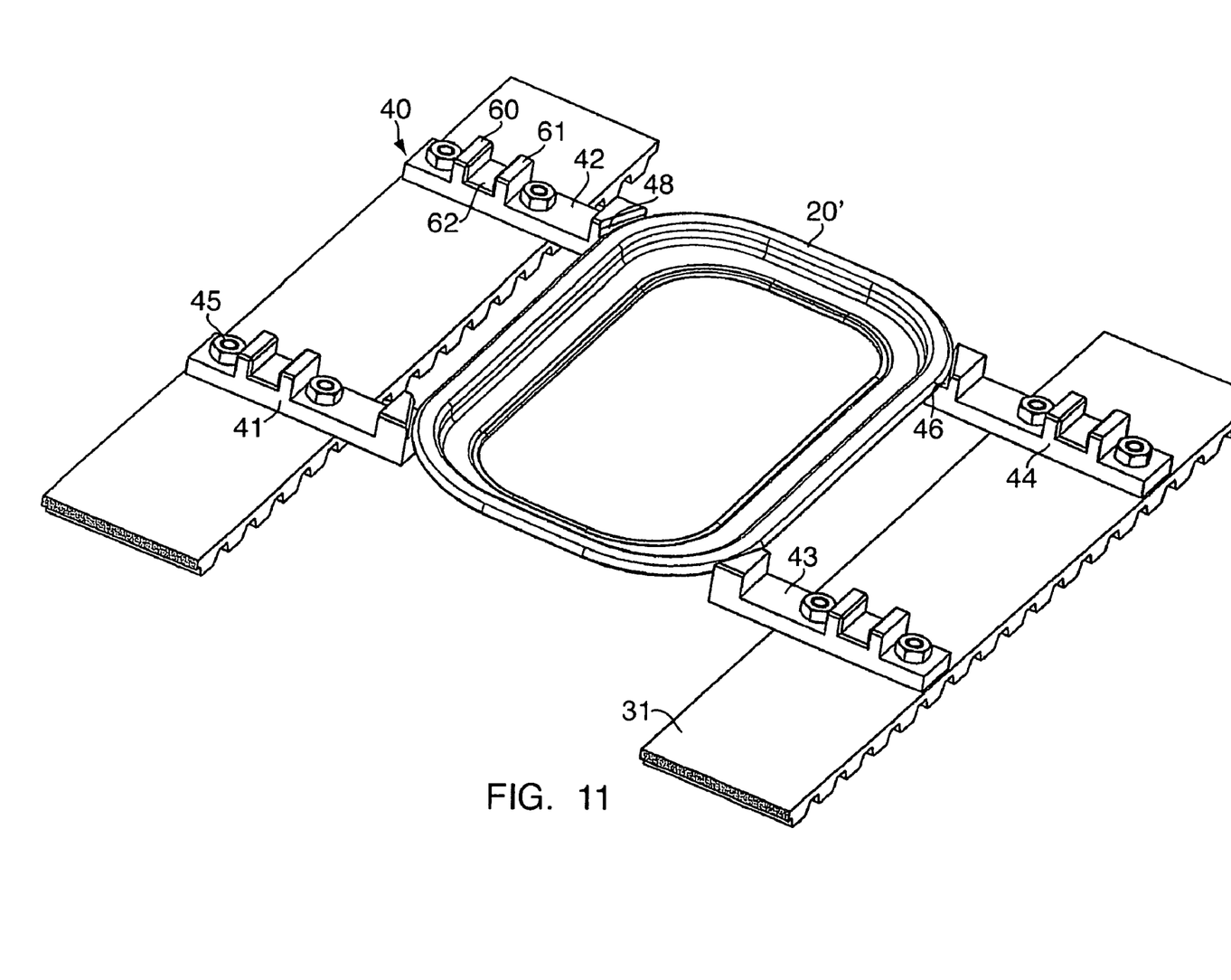
FIG. 11—A view of the toothed belts and drive tongues of FIG. 9 in another position.

FIGS. 10 and 11 show pictorially sections of the toothed belts 31 and 32 having differently arranged driving tongues thereon, which driving tongues are shown generally at 40 and individually as the drive tongues 41 and 42 on the drive belt 32 and as drive tongues 43 and 44 on the toothed belt 31. The FIGS. 10 and 11 therefore show how an adaptation, by spacing adjustment of the toothed belts relative to one another and by an exchange of the toothed belts with differently spaced driving tongues, can be made for different cover shapes.

According to the size and shape of the objects the adaptation can occur either only by adjustment of the spacing of the toothed belts relative to one another, or only by an exchange of toothed belts or by a combination of these methods. The drive tongues 41 to 44 in any event form a support for an object, on which support an object lies. As is visible from these figures, each supported object is accessible from below and from above the support by way of the arrangement of the drive tongues and the aligning of an object on the drive tongues, and the object can be removed from the support 46 provided by the drive tongues and can again be replaced onto such support. The drive tongues further have engagement surfaces 48 which extend upwardly from the support surfaces 46 and which form lateral movement limits for the object. In regard to this it is preferred that the engagement surfaces 44 are essentially flat planar surfaces and are not curved surfaces suiting the shape of the object. By the adjustability of the toothed belts relative to one another and by the possible toothed belt exchange the involved object can be essentially tangentially engaged by the engagement surfaces 48, which is possible for different object shapes because of the flat design of the surfaces 48. Therefore with the flat, non-shape matching design of the engagement surfaces 48 there results a desirable larger adjustment range with the same drive tongues and a corresponding smaller expense since the drive tongues need not be made to be form-fitting.

The drive tongues 41 to 44 are fastened onto the belts 31 and 32 in a known way whereby at least a part of the associated tooth of the belt is removed and replaced by a fastening element which is threadably connected with the drive tongue. This fastening method is well known to the person skilled in the art and is not further illustrated here. Of course all other possibilities for the fastening of the drive tongues to the toothed belts can be used including, for example, adhesive fastening means.

Figure 12:
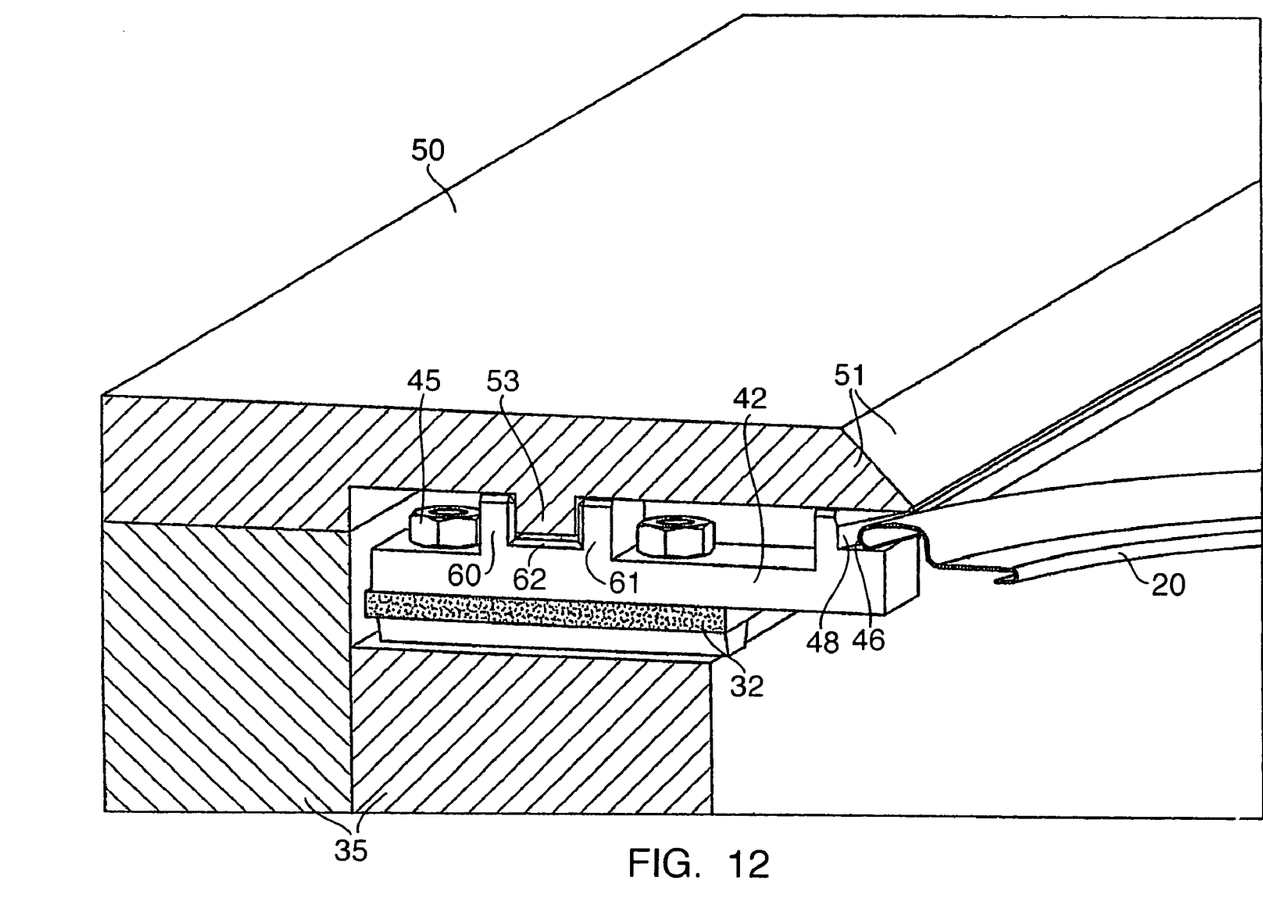
FIG. 12—A partially cut away detailed view of a device of the invention.

It can further be seen that in the preferred embodiment each of the drive tongues in the region of its drive belt has a guide which in the illustrated example is a grooved type guide in the form of the illustrated basic groove 62 and two groove side pieces 60 and 61. In FIG. 12 it is seen how the groove of the drive tongue receives a strip extending into it from above for guiding the drive tongue and which guiding of the drive tongue is effective to keep the toothed from belt swinging or tipping out of the conveying plane or the plane of the upper surface of the toothed belts. Such a guiding increases the immunity to vibration at high stepping rates of drive of the conveyor device and considerably improves the lifting and replacement of the conveyed objects at the processing stations from and to the drive tongues. The guiding can naturally also be arranged laterally of the drive tongues or lateral and overhead guiding can be combined, or several guides can be arranged above and/or laterally. FIG. 12 shows that the strip 53 is a part of the already mentioned cover strip 50. This is a preferred embodiment but the guide can also be formed by some part other than the cover strip 50.

Figure 13:
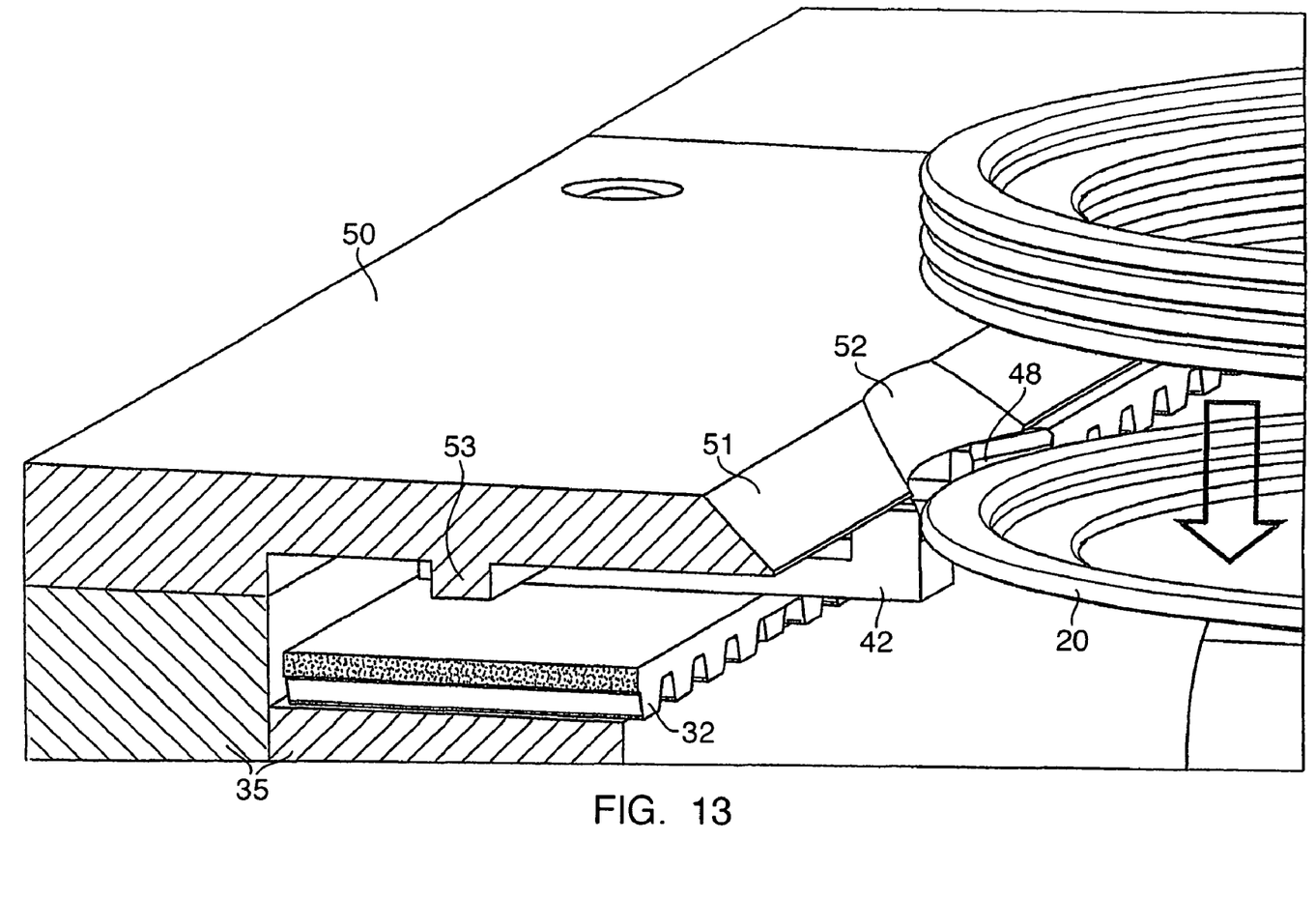
FIG. 13—A partially cut away detailed view of another device of the invention.

FIG. 12 also shows how an object lying on a drive tongue 42 is secured against a lifting from the guide tongue along the conveyor path by a projection 51 covering and extending over the object in the region of the drive tongue. This is an example of a preferred mechanical securement against lifting, which here is formed by the stationary element 51. Other possible mechanical lift preventing devices could be provided which are movable with the drive tongues and which are moveable so that in the region of the processing stations they can be moved to freeing positions relative to the carried object. The illustrated stationary mechanical lift preventor 51 is however a very simple and robust design. In FIG. 13 it is seen how in this design in the vicinity of a processing station, or as illustrated in the vicinity of the stack from which the objects 20 are individually delivered to the conveyor device, a recess 52 is provided in the projection 51 so that at this spot a lifting and replacement of the object from and onto the drive tongue is plausible. One such recess is therefore provided at each processing station at which a lifting and replacement of the conveyed object is to take place. Instead of or in addition to the mechanical lift preventor 51, the drive tongues can also be magnetically designed so that in moving along the conveyor path the conveyed objects are magnetically held in place. The magnetic force is in this case naturally chosen to be only large enough so that at the processing stations a lifting of the objects by the processing stations is possible. The stabilization of the drive tongues by the described guides facilitates the lifting and the replacement of the objects at the processing stations.

Figure 14:
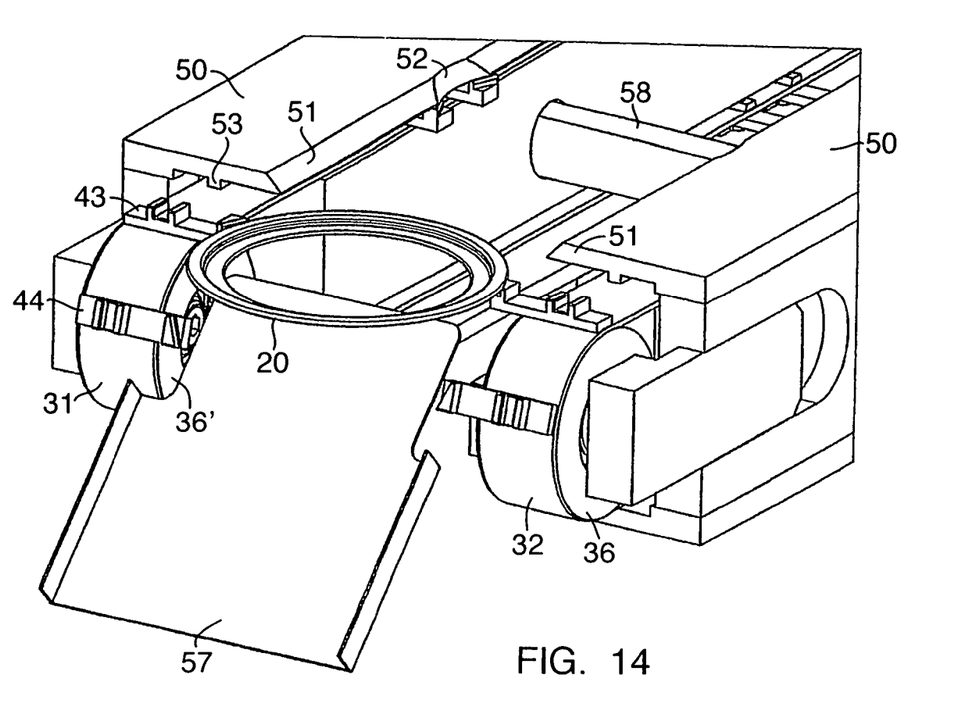
FIG. 14—A view showing the output end of the conveyor device.

FIG. 14 shows the end of the conveyor device, where again the same reference numbers indicate the same elements. From this it is seen how at the end of the toothed belts the drive tongues move downwardly at the end rolls 36, 36' and release the carried object which is then carried away by a chute 57. In the Figure the illustrated object 20 is again a cover ring and is not a finished cover, which has been done only to improve the drawing. Visible again are the cover strips 50 on which are arranged the mechanical lift preventors 51 and the guide strips 53 for the drive tongues.

Figure 15:
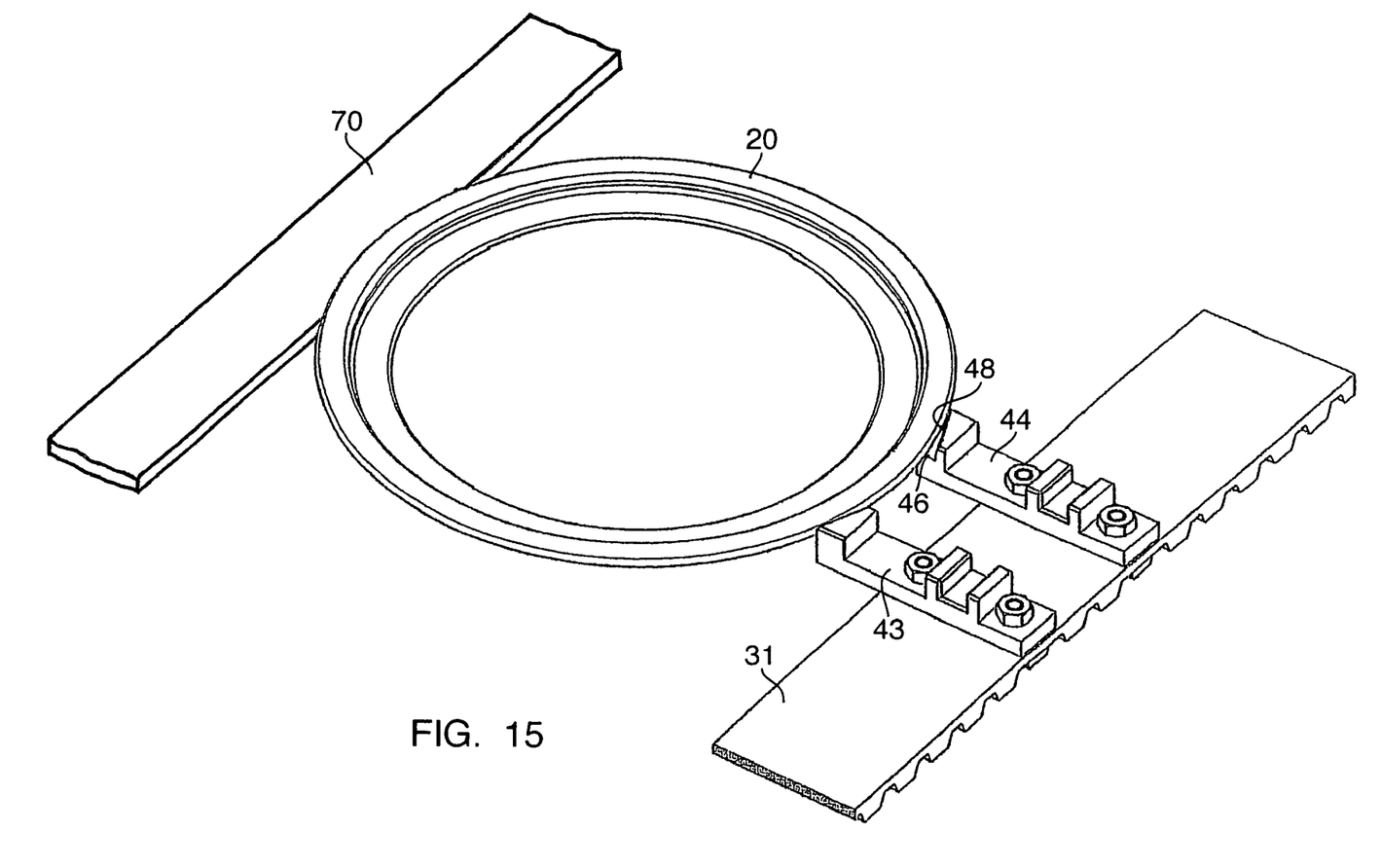
FIG. 15—A view of a variant conveyor device of the invention having a different support means in place of one toothed belt.

FIG. 15 shows an embodiment in which one of the two toothed belts is replaced by a support means 70 onto which an object 20 lies and against which the object is abutted. The support means 70 can be a stationary rail along which an object slides as it is moved by the drive tongues 43 and 44. Also with the support means or rail, preferably a boundary element is provided which hinders a lifting of a cover during its transport. The support means 70 can also be a moveable support means, for example again a toothed belt (without drive tongues) on which the object is supported and against which it is abutted and which moves at the same speed as the object.

While in the present application preferred embodiments of the invention have been described, it is to be understood that the invention is not limited to these embodiments and that the invention can be carried out in other ways while keeping within the boundaries of the following claims.

What is claimed:

1. A method for conveying objects (20) past a number of processing stations, wherein;
    the objects are conveyed by a linear conveying means (31), (32), (40) while remaining in essentially one plane,
    the objects are accessible from both their upper sides and their lower sides,
    the objects at at least one processing station while the conveying means stands still, are lifted from the conveying means, processed, and returned to the conveying means, and
    the objects as they are moved between processing stations are secured against being lifted from the conveyor means; and
    the conveying means includes spaced synchronously running toothed belts, on which belts are arranged drive tongues, each tongue forming a support (46) and an engagement surface (48) for an object to be conveyed.

2. The method according to claim 1, wherein the conveyor means further includes an endless toothed belt (31) with drive tongues (43), (44) each tongue forming a support (46) and an engagement surface (48) for an object to be conveyed, and a fixed or moveable support means (70) positioned opposite the toothed belt on which the object to be conveyed lies.

3. The method according to claim 1, wherein the conveyor means by adjustment of the spacing of the toothed belts from one another or of the toothed belt from the support means the drive tongues can be matched to the shape and/or size of an object to be conveyed.

4. The method according to claim 1, wherein the conveyor means by exchange of the toothed belts or of the toothed belt different spacings of the drive tongues can be adjusted to suit the shape and/or size of an object to be conveyed.

5. The method according to claim 1, wherein the engagement surface has an essentially flat surface for the object to be conveyed, and the support (46) and/or the engagement surface (48) remain unchanged in adjusting the conveyor means to different shapes and/or sizes of objects remains unchanged.

6. The method according to claim 1, wherein at least one of the drive tongues (41-44) is secured by a guide (53), (60-61) against moving out of the conveyor plane during at least a portion of the conveying movement.

7. The method according to claim 6, wherein the guide is formed by at least one linear, stationary first guide part (53) located above or laterally of the associated toothed belt or support means, and receiving that guide part are two guide parts (60), (61) on the at least one drive tongue.

8. The method according to claim 6, wherein the lifting of an object to be conveyed is hindered by a magnetic holding of the object to the drive tongues and/or by at least one mechanical stationary boundary element (51) which hinders a lifting of the object between the processing stations in so far as a movement of the object upwardly is limited.

9. The method according to claim 8, wherein the stationary guides (53) hindering a deflection of the drive tongues and the projection of (51) are a part of a cover (50) above the toothed belt (31), (32) or the support means and especially are a part of a cover strip extending over the toothed belt.

10. The method according to claim 1, wherein the lifting of an object to be conveyed is hindered by a magnetic holding of the object to the drive tongues and/or by at least one mechanical stationary boundary element (51) which hinders a lifting of the object between the processing stations in so far as a movement of the object upwardly is limited.

11. The method according to claim 1, wherein the lifting of an object to be conveyed is hindered by a magnetic holding of the object to the drive tongues and/or by at least one mechanical stationary boundary element (51) which hinders a lifting of the object between the processing stations in so far as a movement of the object upwardly is limited. as a movement of the object upwardly is limited.

12. The method according to claim 11, wherein the boundary element is a projection (51) extending laterally over the drive tongues along the run of the toothed belt or the run of the supporting means, which boundary element has recesses (52) at the processing stations which recesses permit a lifting of the object from the drive tongues.

13. The method according to claim 1 adapted for the transport of covers, cover rings, or cover blanks, and the processing stations include at least one of a stamping station, a foil heat sealing station and a test station.

14. The method according to claim 13, wherein several linear conveyor means (30), (30') are used in parallel with one another.

15. A device for conveying objects (20) to be processed past a number of processing stations (3-9), wherein:
    the objects are conveyed by a linear conveying means (31), (32), (40) while remaining in essentially one plane,
    the objects at timewise spaced stationary pauses of the conveyor device are liftable from and returnable to the conveyor device,
    the objects during their conveying movement are secured against being lifted from the conveyor device, and
    the conveyor device is formed by at least two spaced synchronously circulating toothed belts, the toothed belts comprising drive tongues forming at least one support (46) for an object to be conveyed.

16. The device according to claim 15, wherein the conveyor means includes one circulating toothed belt (31) with driving tongues (43-44) forming a support (46) and an engagement surface (48) for an object to be conveyed, and a fixed or moveable support means (70), arranged oppositely to the toothed belt on which an object be conveyed lies.

17. The device according to claim 15, wherein the conveyor means by an adjustment of the spacing of the toothed belts from one another, or the spacing of the toothed belt from the support means, the drive tongues can be matched to the shape and/or size of the object to be conveyed.

18. The device according to claim 15, wherein the conveyor means by the exchange of the toothed belts or of the toothed belts for ones having differently spaced drive tongues can match the drive tongues to the shape and/or size of the object to be conveyed.

19. The device according to claim 15, wherein the drive tongues each have a support section (46) and an essentially flat surface shaped engagement section (48) for the object to be conveyed and which support section and at least the abutment section remain unchanged in matching the conveyor means to different shapes and/or sizes of objects.

20. The device according to claim 15, wherein at least a part of each drive tongue (41-48) is secured against a deflection of the drive tongue out of the conveyor plane by a guide (53), (60), (61), (62) throughout at least a part of the conveyor path.

21. The device according to claim 20, wherein the guide is formed by at least one linear stationary first guide part (53) located above or laterally of the associated toothed belt or of the support means and by two guide parts on a drive tongue which receive the guide part (53).

22. The device according to claim 20, wherein a lifting is hindered by at least one stationary boundary element (51) which hinders a lifting of the object between the processing stations.

23. The device according to claim 22, wherein the guide (53) hindering a deflection of the drive tongues and the projection (51) are part of a cover, and especially of a covering strip, located above the toothed belt or above the support means.

24. The device according to claim 15, wherein a lifting is hindered by at least one stationary boundary element (51) which hinders a lifting of the object between the processing stations.

25. The device according to claim 15 adapted for the transport of covers or cover rings to a number of processing stations.

26. The device according to claim 25 wherein several devices (30), (31) are arranged parallel to one another.

27. The device according to claim 15, wherein a lifting is hindered by at least one stationary boundary element (51) which hinders a lifting of the object between the processing stations.

28. The device according to claim 27, wherein the boundary element is a projection which extends laterally over the drive tongues along the run of the toothed belt or of the support means, which boundary element has recesses (52) at the processing stations which permit a lifting of the objects from the driving tongues.

* * * * *

UNITED STATES PATENT AND TRADEMARK OFFICE
CERTIFICATE OF CORRECTION

PATENT NO. : 7,779,985 B2  
APPLICATION NO. : 11/660402  
DATED : August 24, 2010  
INVENTOR(S) : Peter Gysi Page 1 of 1

It is certified that error appears in the above-identified patent and that said Letters Patent is hereby corrected as shown below:

In the Claims:  
Column 8, line 23, after "limited." please delete "as a movement of the object upwardly is limited.".

Signed and Sealed this  
Fourth Day of January, 2011

David J. Kappos  
*Director of the United States Patent and Trademark Office*